April 17, 1934.  L. C. MILLS  1,955,711
PNEUMATIC TIRE
Filed May 21, 1932
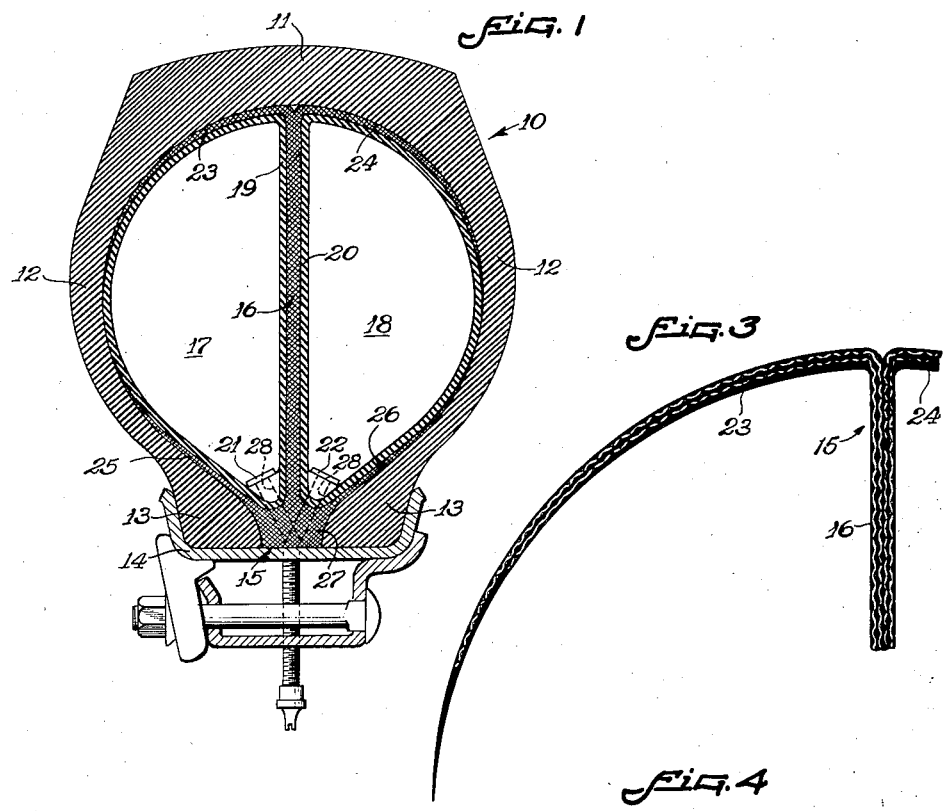
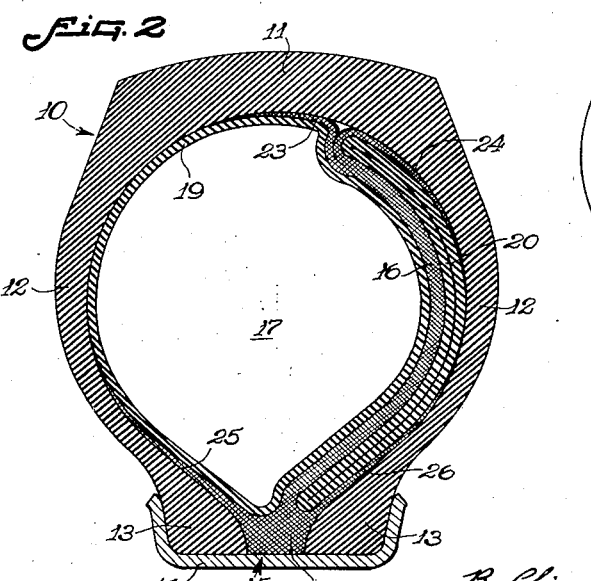
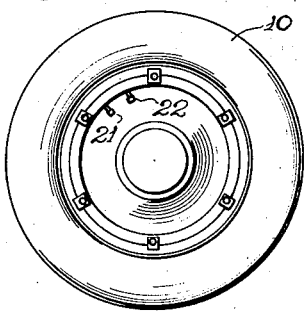
Inventor
Lawrence C. Mills
By Chindahl, Parker & Carlson
Attorneys Patented Apr. 17, 1934

1,955,711

UNITED STATES PATENT OFFICE 1,955,711

PNEUMATIC TIRE

Lawrence C. Mills, Chicago, Ill.

Application May 21, 1932, Serial No. 612,773

6 Claims. (Cl. 152—22)

My invention relates to pneumatic tires for vehicles, and has particular reference to a tire provided with two inner tubes so that upon the deflation of one tube, the other tube will carry the load without the necessity of immediate attention.

An important object of the present invention resides in the provision of a novel inner partition member or shoe for separating and enclosing the inner tubes and for reenforcing the main outer casing.

Another object is to provide a partition member of the foregoing character which will not interfere with the normal shape and resiliency of the tire, and which is simple and inexpensive in construction, reliable and efficient in use and not likely to crimp or in any way injure the inner tubes.

Further objects and advantages will become apparent as the description proceeds.

In the accompanying drawing, Figure 1 is a transverse sectional view of an inflated tire embodying the features of my invention.

Fig. 2 is a view similar to Fig. 1 but showing the tire with one of the inner tubes deflated.

Fig. 3 is a transverse sectional view of the inner partiiton member.

Fig. 4 is a side view on a reduced scale of a tire and wheel assembly.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the tire constituting the preferred embodiment of the invention comprises an outer casing 10 of standard construction having an outer peripheral tread wall 11 and side walls 12 terminating in peripheral beads 13 adapted to seat on the usual wheel rim 14.

Removably disposed in the casing 10 is an annular partition member 15 comprising a diametrical partition wall or web 16 bisecting the interior of the casing on a vertical medial plane to form two lateral compartments 17 and 18. Two inner tubes 19 and 20 provided respectively with suitable valve fittings 21 and 22 are inserted respectively in the compartments 17 and 18, and bear against opposite sides of the wall 16.

The outer peripheral edge of the wall 16 is integral with two oppositely extending flaps 23 and 24 which are disposed against the inside of the tread wall 11 and hence constitute a reenforcing shoe. Similarly, the inner peripheral edge of the wall 16 is integral with two oppositely extending flaps 25 and 26 which are adapted to lie against the side walls 12 and particularly to close the peripheral opening between the beads 13. Preferably, an annular rib or projection 27 is formed on the inner edge of the wall 16 at its juncture with the flaps 25 and 26 to fill out the opening between the beads and to rest on the rim 14.

The flaps 23 to 26 are long and gradually tapered in order to afford a smooth interior not likely to pinch or crimp the inner tubes 19 and 20 and to provide a reenforcing covering substantially enveloping the tubes. Thus, the outer flaps 23 and 24 each extend through approximately one-fourth of the transverse circumference of the casing 10, while the inner flaps 25 and 26 are shorter than the outer flaps so that the two sets of flaps will not meet completely at the outer sides of the tubes 19 and 20, and may each extend through about one-eighth or a little more of said circumference.

The flaps 23 to 26 and the partition wall 16 also are thin and flexible so that the normal shape and resiliency of the tire when inflated will not be impaired and that in the event of one inner tube becoming inflated, the wall will yield readily to the expansion of the remaining tube.

The partition member 15 may be made of any suitable yieldable or flexible material. In the present instance, the partition wall 16 consists of four plies of rubber impregnated fabric. At the outer and inner edges of the wall 16, the four plies are separated into pairs to form respectively the flaps 23 and 24 and the flaps 25 and 26. The two outer plies of the wall 16, which constitute the inside plies of the flaps are shorter in length than the two intermediate plies so that the flaps are gradually tapered in thickness and merge smoothly with the interior of the casing 10. Thus, these outer plies may extend two-thirds the length of the flaps 23 and 24, and three-fourths the length of the flaps 25 and 26.

Suitable apertures 28 are provided in the partition member 15 for the reception of the air valve fittings 21 and 22. The valve fittings 21 and 22 may be of any suitable construction. In the present instance, they are entirely separate of each other and have bent valve stems as shown in Fig. 1 so that the inner tubes are also independent of each other and capable of being used interchangeably in either side of the tire casing 10.

It will be evident that when both inner tubes 19 and 20 are fully inflated, as shown in Fig. 1, the partition wall 16 will be held erect, and the flaps 23 to 26 will practically envelop the tubes, thus reenforcing the outer casing 10 at the most vulnerable points and protecting the inner tubes. In the event that one of the inner tubes becomes deflated, for example either through a puncture, blowout or leaky valve, the other of the inner tubes will expand to assume the full inner space of the casing 10, and thereby will maintain the tire sufficiently inflated to avoid any necessity for immediate attention. In expanding, the inner tube presses the partition wall 16 to one side where it and the collapsed tube serve to close the leak if present in the casing 10. The outer flaps 23 and 24 may be partially displaced, while the inner flaps 25 and 26 and the partition member 15 as a whole are held substantially in place by the rib 27. The aforesaid adjustment is readily effected without crimping the inner tubes by reason of the smooth interfit of all the parts, and the pliancy and shape of the partition member 15. Since the partition member 15 is in the form of a shoe substantially strengthening the outer casing and also guarding the inner casing against punctures and injury, the likelihood of punctures and particularly blowouts is greatly reduced, thus eliminating an element of danger heretofore present in single tube tires.

I claim as my invention:

1. In a pneumatic tire, in combination, an outer casing, two inner tubes arranged side by side in said casing, and a removable shoe of flexible rubber impregnated fabric for said tubes in said casing, said shoe comprising a thin annular partition wall between said tubes, thin oppositely extending side flaps joined to the outer peripheral edge of said wall and disposed against the inside of the tread wall of said casing and overlapping the adjacent portions of said tubes, each of said flaps extending substantially through one-fourth of the transverse circumference of said casing, thin oppositely extending side flaps joined with the inner peripheral edge of said partition wall and overlapping the adjacent portions of said tubes, and an inner peripheral rib integral with said partition wall externally of said last mentioned side flaps.

2. In a pneumatic tire, in combination, an outer casing, two inner tubes arranged side by side in said casing, and a removable shoe for said tubes in said casing, said shoe comprising a thin annular flexible integral partition wall between said tubes, thin elongated, oppositely extending flexible side flaps jointed integrally to the outer peripheral edge of said wall and disposed against the inside of the tread wall of said casing and overlapping the adjacent portions of said tubes, thin elongated, oppositely extending flexible side flaps joined integrally with the inner peripheral edge of said partition wall and overlapping the adjacent portions of said tubes, said wall and said flaps substantially enclosing said tubes, and means whereby the inner edge of said wall and said last mentioned flaps are held against lateral shifting movement in said casing, while said first mentioned flaps are free for lateral shifting movement upon deflation of one of said tubes.

3. In a pneumatic tire, a flexible partition member comprising a thin annular wall, thin elongated oppositely extending side flaps joined to the outer peripheral edge of said wall, and thin elongated oppositely extending side flaps joined with the inner peripheral edge of said wall, and an inner peripheral rib integral with said partition wall externally of said last mentioned side flaps.

4. In a pneumatic tire, in combination, an outer casing, two inner tubes arranged side by side in said casing, and a removable shoe for said tubes in said casing, said shoe comprising a thin annular partition wall having a plurality of plies of rubber impregnated fabric between said tubes, thin elongated oppositely extending side flaps joined to the outer peripheral edge of said wall and disposed against the inside of the tread wall of said casing and overlapping the adjacent portions of said tubes, said flaps being formed by a separation of said plies at the outer periphery of said wall, each of said flaps extending substantially through one-fourth of the transverse circumference of said casing and being tapered, thin elongated oppositely extending side flaps joined with the inner peripheral edge of said partition wall and overlapping the adjacent portions of said tubes, said last mentioned side flaps being formed by a separation of said plies at the inner periphery of said wall, each of said last mentioned flaps extending through approximately one-eighth of said circumference and being tapered, and an inner peripheral rib integral with said partition wall externally of said last mentioned side flaps.

5. In a pneumatic tire, in combination, an outer casing having a tread wall and side walls terminating with annular beads, two inner tubes arranged side by side in said casing, a thin flexible medial wall extending inwardly from said tread wall between said tubes, thin elongated flexible tapered oppositely extending flaps integral with the inner peripheral edge of said radial wall and overlapping the adjacent portions of said tubes, and a rib on said edge outside of said flaps disposed between said beads.

6. A flexible one-piece partition member for a pneumatic tire having an outer casing and two inner tubes adapted to be inflated side by side in said casing, said member comprising a thin flexible annular wall adapted to be positioned between said tubes, and adapted for lateral flexure and displacement in response to inflation of one of said tubes to fill said casing upon deflation of the other of said tubes, two thin flexible oppositely extending annular end flaps integral with the outer peripheral margin of said wall, and two thin flexible oppositely extending annular end flaps integral with the inner peripheral margin of said wall, said inner and outer end flaps being adapted to extend partially about said tubes and normally held in place thereby against the inner surface of said casing, said outer end flaps being free for lateral displacement with said wall upon deflation of one of said tubes.

LAWRENCE C. MILLS.